United States Patent [19]

Garza

[11] 4,376,631
[45] Mar. 15, 1983

[54] TEMPORARY FAN BELT REPLACEMENT FOR EMERGENCY PURPOSES ON MOTOR VEHICLES

[75] Inventor: Robert L. Garza, Toledo, Ohio

[73] Assignee: James Schuster, Pueblo West, Colo.

[21] Appl. No.: 186,907

[22] Filed: Sep. 15, 1980

[51] Int. Cl.³ ............................................. F16G 11/08
[52] U.S. Cl. .................................................. 474/255
[58] Field of Search ...................... 474/256, 255, 258; 198/853

[56] References Cited

U.S. PATENT DOCUMENTS

| | | | |
|---|---|---|---|
| 161,508 | 3/1875 | Hare | 474/255 X |
| 465,652 | 12/1891 | Avery | 474/255 X |
| 1,505,553 | 8/1924 | Gilmore | 474/255 X |
| 2,179,655 | 11/1939 | Cutler | 474/255 X |

*Primary Examiner*—Nile C. Byers, Jr.
*Attorney, Agent, or Firm*—George R. Royer

[57] ABSTRACT

The subject invention is an emergency fan belt replacement for use in motor vehicles as a temporary remedial measure to supplant the installed conventional fan belt whenever the latter might fail or otherwise become severed during operations. Specifically, the subject invention is a temporary fan belt replacement, with the same cross-sectional configuration and girth as compared to the conventionally used and installed fan belt. The temporary belt herein has a buckle integrally attached to one end of the belt and which buckle receives the opposite, free end of the belt. Further, such buckle is adapted to shorten or lengthen the temporary belt to conform to the required radial distance between the crankshaft pulley and the pulley for the water pump. The aforesaid buckle is further comprised of clip means to lock the free end of the belt protruding beyond the mouth of buckle so that such free end cannot interfere with the revolutionary movements of the subject belt.

2 Claims, 7 Drawing Figures

U.S. Patent   Mar. 15, 1983   4,376,631
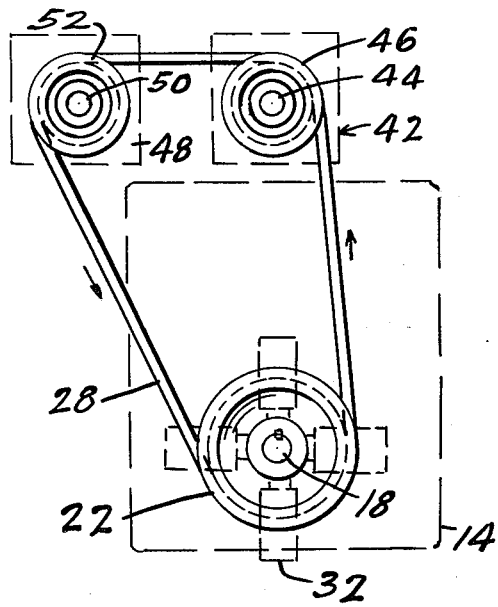
FIG-1-
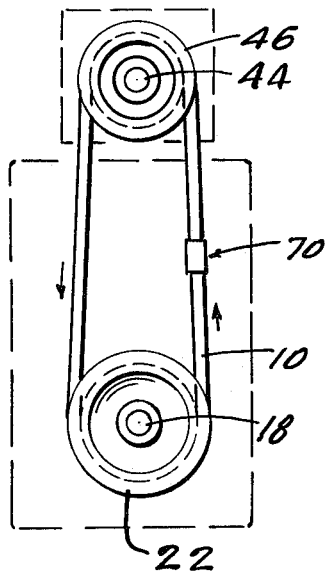
FIG-2-
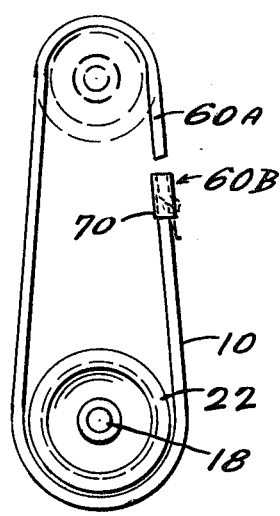
FIG-3-
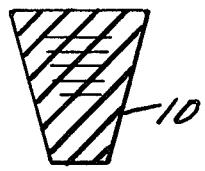
FIG-4-
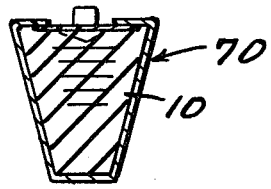
FIG-5-
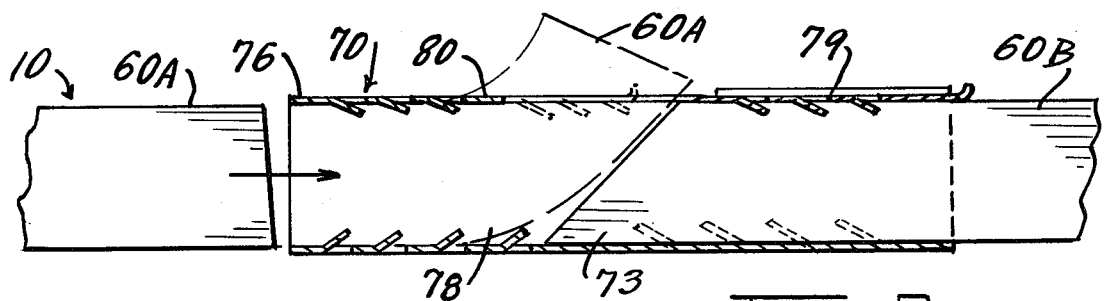
FIG-6-
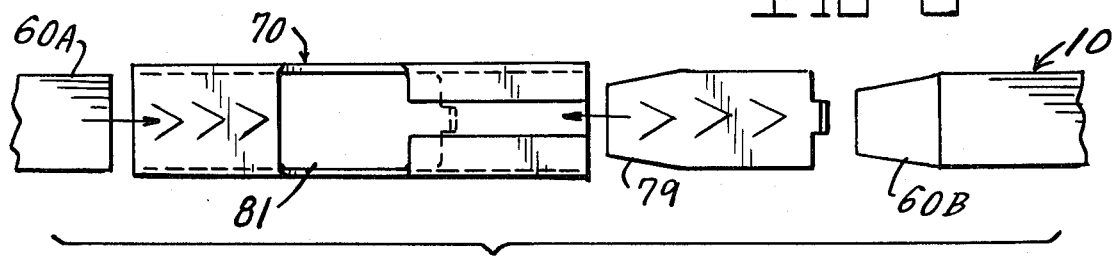
FIG-7-

TEMPORARY FAN BELT REPLACEMENT FOR EMERGENCY PURPOSES ON MOTOR VEHICLES

BACKGROUND OF THE INVENTION

The subject invention relates to the mechanically driven cooling means for internal combustion engines for automobiles and other vehicles, and in particular relates to mechanically driven fan belts used on such vehicles for driving the water pump during operation of the vehicle.

In general, in most automobiles or other similar vehicles, a closed loop fan belt is utilized to drive two working elements of essential importance to the operation of the vehicle, namely the water pump and the generator. The function of the water pump, as is well-known, is to pump water through the cooling system of the engine in order to prevent the engine from overheating while operating. The function of the generator is to produce the requisite electricity for generating sparking in the spark plugs for ignition purposes and further drive auxiliary vehicular devices.

All of these foregoing described functions are critical to the proper operation of a motor-driven vehicle; and should the installed fan belt break during operation, the resultant loss of these vital functions imperil the continued safe operation of the engine. From a comparative viewpoint and most acutely, however, is the potential loss of a water pump for cooling the engine. From a safety perspective, in situations where the generator is lost, a battery already minimally charged should produce sufficient electrical current for spark generation in ignition for temporary driving interval. On the other hand, if the water pump becomes inoperative for any reason, including the loss of motive power through a fan belt failure, such loss is much more critical than loss of the generator. The engine in such latter circumstances cannot operate for any significant periods without the critical assistance of the indirect cooling functions of a driven fan to project air currents over the engine in conjunction with the circulatory movements of water in the water cooling system. In such cases the engine can overheat in a matter of a few miles, with resultant permanent damage to vital engine parts, and ultimately engine failure.

Thus, as can be seen, when a vehicle loses a fan belt, the potential problems are extremely critical. As a consequence, one should be prepared under emergency circumstances to replace a broken fan belt, particularly on isolated stretches of road where repair stations are long distance away from the disabled vehicle. The obvious consequential alternatives in such a situation are limited indeed, and having at hand a replacement belt is one possible alternative. In this regard, there are no known inventions directed to this problem of emergency fan belt replacement under such exigent circumstances.

In view of the foregoing, it is a purpose of the subject invention to provide a device which can be used as an emergency replacement for fan belts. The following objects of the subject invention are therefore directed accordingly.

OBJECTS

In view of the foregoing discussion of the prior art, the following are objects of the subject invention:

It is an object of the subject invention to provide an emergency fan belt replacement for use on internal combustion engines;

Another object of the subject invention is to provide an improved device for emergency use as a fan belt in an automobile;

Still another object of the subject invention is to provide an improved method of replacing a temporary fan belt under emergency circumstances;

A further object of the subject invention is to provide an improved fan belt in an internal combustion engine to be used for emergency temporary replacement;

Yet another object of the subject invention is to provide an improved fan belt for motor vehicle engines;

A further object of the subject invention is to provide an improved replacement fan belt assembly for internal combustion engines;

A further object of the subject invention is to provie a novel temporary fan belt replacement for motor vehicles;

Other and further objects of the subject invention will become manifest upon a reading of the following description taken in conjunction with the claims.

DESCRIPTION OF THE DRAWINGS

In the drawings:

FIG. 12 is a schematic and elevational view of the conventional fan belt as attached to the pulleys on the respective shafts of the crankshaft, the generator, and the water pump;

FIG. 2 is an end elevational view of the subject invention as used and installed around the pulleys of a crankshaft and water pump shaft;

FIG. 3 is an end elevational view of the subject fan belt invention, as installed;

FIG. 4 is a cross-sectional view of the buckling device, as installed, used to couple the ends of the subject fan belt;

FIG. 5 is a side elevational view of the subject buckling device, shown in cross-sectional configuration;

FIG. 6 is a top elevational view of the subject buckling device, shown partially in section;

FIG. 7 is a cross-sectional view of a conventional fan belt shown for comparative purposes in discussing the preferred embodiment of the subject invention.

DESCRIPTION OF GENERAL EMBODIMENT

The subject invention is a temporary belt replacement for a fan belt as used in an internal combustion engine used in motor vehicles. The invention herein comprises a disjoined or open fan belt of a fixed length, but which has a buckle member on the one end adapted to adjust the relative length of the belt to conform to the precise distance between the respective pulleys on the crankshaft and the water pump on a specific motor vehicle.

The subject fan belt is designed as a temporary fan belt replacement limited in scope of usage, which is adapted to be placed around the crankshaft pulley, as concentrically mounted on the crankshaft, and the water pump pulley mounted a set distance off from the crankshaft pulley. As installed in the temporary condition, the generator pulley and shaft are bypassed by the subject fan belt, as the replacement is considered to be only of a temporary duration. Moreover, the subject fan belt is provided with a buckle integrally affixed to the one end of such belt, into which buckle the open and free end of the belt can be inserted. This free belt end is pulled through the buckle and locked in the buckle once the belt is appropriately installed around the required distance between the crankshaft and the water pump pulleys, as indicated above. A locking device on the buckle is provided to secure the belt in place in the buckle at its desired length. Once such a desired length for the belt is achieved, the free end of the belt extending up beyond the top of the buckle is cut, thereby removing any superfluous portion of the belt protruding up beyond the buckle, thereby preventing any rotational interference with the belt movement.

DESCRIPTION OF PREFERRED EMBODIMENT

Referring now to the drawings, and particularly to FIGS. 2 and 3, in which a preferred embodiment is shown, a temporary fan belt replacement 10 is represented. This particular fan belt 10 with its concomitant structural appendages, as described below, is only one specific embodiment within the total scope of the subject invention. In this latter regard, other possible embodiments, not specifically described herein, are contemplated, as evidenced by the claims set forth herein. Therefor, the following description is not to be considered as limiting the scope of the subject invention.

The subject invention is specifically applicable to internal combustion engines as employed in motor vehicles of all types. In this regard, in specific reference to FIG. 1, the forward end, as viewed frontally, of an internal combustion engine block 14 is shown in phantom, with a crankshaft 18 disposed on the lower central portion of said motor block. A circular pulley 22 is concentrically and coaxially mounted on the forward end of the crankshaft 18, such that pulley 22 rotates as a concentric and integral unit with said crankshaft 18. This latter pulley 22 serves as the drive pulley for a conventionally constructed and installed fan belt 28 as represented in FIG. 1. A multi-bladed propeller type fan 32 is also integrally and concentrically affixed to the front end of said crankshaft 18 and is conventionally joined to said crankshaft adjacent said drive pulley 22. Preferably and usually, the drive pulley 28 is positioned intermediate the engine block 14 and the fan propeller 32. The radially center of fan propeller 32 has a sleeve fixed concentrically about the crankshaft 18 such that the fan also rotates as a coaxial unit with the crankshaft 18. The fan propeller 32 serves, as it turns about shaft 18, to propel relatively cool air currents over the engine block 14 to aid in and supplement the engine cooling process.

Fixedly mounted on or about the upper surface of the engine block 14 is a water pump 42, shown schematically, having a rotatably mounted shaft 44 to drive said pump. Mounted for concentric rotation about shaft 44 is a circular drive pulley 46. Fixedly situated adjacent said engine block 14 is generator 48, also schematically shown. More specifically, located in a position approximately laterally offset to the upper surface of said engine block 14 is generator 48. Said generator comprises, among other components not shown, a drive shaft 50, upon which is cencentrically mounted a drive pulley 52. Drive pulley 52 is structured and utilized to drive generator 48 for its attendant functions. Each pulley 52 and 46 are driven pulleys, and as such they each are driven by the external rotational drive forces imparted by the fan belt 28.

Conventionally structured and installed fan belt 28 is mounted around the driven pulleys 52 and 46, as shown in FIG. 1. Specifically and in the usual conventional constructional arrangement, the fan belt 28 engages drive pulley 22, and thence one part tangentially engages pulley 46 which drives the working shaft of water pump 42, and the other part engages upper circumference of pulley 52, with a joinder between pulleys 56 and 46, as shown in FIG. 1. Alternately stated, the fan belt 28 extends downwardly to the bottom of drive pulley 22 to complete the closed loop cycle around all three pulleys 22, 46 and 52. As seen, and as generally known, fan belt 28 is a continuous closed member designed to loop all specified pulley members as indicated. As pulley 22 is driven by crankshaft 18, it drives water pump pulley 46 and generator pulley 52 through said rotational movement of belt 28.

It can thus be seen that if the fan belt 28 breaks, the water cooling system has no independent means of rotating the pulley 46 for operating water pump 42. The subject invention herein is conceived as a temporary replacement for said fan belt 28 whenever it becomes severed while on the highway a relatively long distance away from appropriate service areas.

Turning now to FIGS. 2, 3, 4, 5 and 6, the subject invention is incorporated into an open-ended fan belt 10 having opposing ends 60A and 60B. The end 60B of belt 10 is provided with a buckle 70 integrally affixed on such end 60B. Said buckle 70 being structured with an internal channel 78 to receive the free end 60A of the belt 10 and lock same into position at the length dictated by the size of the crankshaft pulley 22 and driven water pump pulley 46, as well as the distance between the latter two pulleys on a given automobile.

The belt 10 as shown has the same V-shaped cross-sectional configuration as represented in FIG. 3, and has the same cross-sectional size as does conventional fan belt 28 which it is used to temporarily replace. Moreover, the buckle 70 has the same cross-sectional size and configuration as the conventional belt 28. As stated above, on the end 60B of the belt 10 which is opposite to the free end 60A is a buckle 70, as shown. Buckle 70 is integrally attached to such end 60B as seen in FIG. 5 and 6, and is structured to receive the free end 60A in an internal channel 78 therein, which channel leads from the forward end 66 of the buckle 70 to the rear upper section 80 of said buckle 70 as shown. Furthermore, the buckle 70 has a solid, posterior portion 73 thereof which lies aft of the channel 78 and which posterior portion serves as a supportive shank of the buckle 70. A slidable clip 79 disposed on the upper portion of the buckle is used to lock the belt in position, and is movable back and forth in a longitudinal movement from a locked or unlocked position, as needed. On the forward part of the clip are teeth members 80 of relatively acute angular disposition and which teeth are structured to actually pierce that portion of the belt 10 that is inserted up through inclined channel 78 when the clip 79 is moved into the locked position 79. Any portion of the belt 10 lying above clip 79 is cut off as superfluous material.

Thus, as seen, said buckle 70 is an integral extension to the one end 60B of said belt 10 such that it is a continuous extension of belt 10, as seen in FIG. 5. The cross-sectional configuration of said buckle 70, as viewed in FIG. 4, is V-shaped to conform in both size and shape to the V-shaped cross-sectional configuration of the belt 10 itself. This configuration is a critical aspect of the belt 10 and most particularly, the bottom thereof must be similar in shape and size to bottom on the radially inner portion of said belt 10 so that it can fit and ride around the pulleys.

It is desirable that the buckle 70 be made of a fairly pliable plastic material so that it can flex a minimal degree as it rides around the respective pulleys 22 and 46, as shown. Additionally, the length of the buckle must be minimal, as too great a length would detract from the overall flexibility of the belt substitute 10.

In operation, the subject invention is utilized as follows: First, the broken belt 28 is removed from around the respective pulleys. Belt 10 is then drawn over water pump pulley 46 and drive shaft pulley 22 as shown in FIG. 3. Once in such latter position, the belt 10 is interlocked by placing free end 60A of belt 10 through channel 78 in buckle 70 on belt end 60B. As it is drawn up through channel 78, projecting teeth 90 on the inside of channel help lock the belt 10 in position, and clip 79 is moved into position 79A with teeth 80 piercing that part of belt 10 projecting up just above upper level of the buckle 70. Once the clip 79 is locked in place, the extraneous portion of the belt 10 is cut off.

While a preferred embodiment of the subject invention has been shown, the precise description thereof is not to be considered as limiting the scope of the following claims.

I claim:

1. A temporary replacement for a fan belt for motor vehicles comprising in combination:

(a) an open-ended belt member, having two opposing ends; specifically a first end and a second end;
(b) a buckle member on the first end of such belt member, said buckle having a cross-sectional configuration and girth substantially identical to other portions of said belt member; said buckle member having an internal channel therein such channel adapted to receive the second end of said belt member;
(c) locking means on said buckle member to lock said second end of said belt member in said buckle channel.

2. A temporary replacement for a fan belt for motor vehicles comprising in combination:

(a) an open-ended belt member, having two opposing ends; specifically a first end and a second end;
(b) a buckle member on the first end of such belt member, said buckle having a cross-sectional configuration and girth substantially identical to other portions of said belt member; said buckle member having an internal channel therein such channel adapted to receive the second end of said belt member;
(c) locking means on said buckle member to lock said second end of said belt member in said buckle channel, said locking means comprising a sliding knife-like member adapted to engage a portion of the second end of said belt member.

* * * * *